United States Patent [19]
Barkat et al.

[11] Patent Number: 5,717,307
[45] Date of Patent: Feb. 10, 1998

[54] APPARATUS AND METHOD FOR IDENTIFYING THE TYPE AND BRAND OF A BATTERY FOR A PORTABLE DEVICE

[75] Inventors: Shakil H. Barkat, Bartlett; Michael S. Cruz, Buffalo Grove; Richard Ng, Cary, all of Ill.

[73] Assignee: Motorola, Inc., Schaumburg, Ill.

[21] Appl. No.: 686,638

[22] Filed: Jul. 24, 1996

[51] Int. Cl.$^6$ .................... H01M 10/44; H01M 10/48
[52] U.S. Cl. .................... 320/5; 320/2; 320/35; 320/15; 320/48
[58] Field of Search .................... 320/2, 5, 15, 35, 320/48; 429/7, 90, 96, 97, 98

[56] References Cited

U.S. PATENT DOCUMENTS

| | | | |
|---|---|---|---|
| 5,164,652 | 11/1992 | Johnson et al. | 320/2 |
| 5,237,257 | 8/1993 | Johnson et al. | 320/2 |
| 5,422,624 | 6/1995 | Smith | 320/2 X |
| 5,455,499 | 10/1995 | Uskali et al. | 320/43 |
| 5,552,790 | 9/1996 | Gunnarsson | 342/51 |
| 5,592,069 | 1/1997 | Dias et al. | 320/30 |

*Primary Examiner*—Peter S. Wong
*Assistant Examiner*—Patrick B. Law
*Attorney, Agent, or Firm*—Rolland R. Hackbart

[57] ABSTRACT

A portable cellular radiotelephone (100), which is powered by main and auxiliary batteries (101, 102) in an operating state. The main and auxiliary batteries (101, 102) include respective memories (402, 410) for storing a 64-bit registration number and 1024 bits of data for identifying the type and brand of such batteries. Memories (402, 410) store a laser-engraved 64-bit registration number and 1024 bits of data. In order to uniquely identify the batteries (101, 102), the 64-bit registration number includes a twelve-bit brand code having a predetermined brand code value and an eight-bit type code having a predetermined type code value, and the 1024 bits of data include a unique multi-character message. By identifying the unique brand code, type code and multi-character message when a battery is inserted into portable device (100), it can be insured that the portable device (100) will be operated with a reliable and safe battery. Otherwise, the portable device is turned off and the battery is not charged.

29 Claims, 8 Drawing Sheets

APPARATUS AND METHOD FOR IDENTIFYING THE TYPE AND BRAND OF A BATTERY FOR A PORTABLE DEVICE

BACKGROUND OF THE INVENTION

1. Field of the Invention

The present invention relates generally to batteries, battery apparatus, and battery powered equipment, and more specifically to batteries each having a memory for storing battery identification data and portable radio telephones adapted to determine the identify of such batteries prior to operation with, or charging same.

2. Description of the Related Art

Battery-powered portable devices have become increasingly popular due to their light weight and compactness. These portable devices, such as cellular radiotelephones, cordless telephones and laptop computers, are typically equipped with one or more rechargeable batteries or battery packs each including multiple battery cells of several different type, such as for example nickel-cadmium (NiCd), nickel-metal hydride (NiMH), alkaline, or lithium ion cells. Since the batteries may be any one of such several types, it is important for both reliable and safe operation to be able to identify the type of the battery before operating the portable device from, or charging such batteries. According the U.S. Pat. Nos. 5,164,652 and 5,237,257, resistors of different values are used to identify whether the capacity of a particular type of battery is small, medium or large. More recently, a memory including data identifying the battery type and capacity has been incorporated into batteries, and is read out by the portable device before charging such batteries. However, none of these prior techniques insures that the portable device is operating from or charging a battery of predetermined brand known to be reliable and safe.

Accordingly, there is a need for is an improved apparatus and method for identifying the type and brand of batteries prior to operating a portable device from, or charging such batteries.

DETAILED DESCRIPTION OF THE PREFERRED EMBODIMENTS

Figure 1:
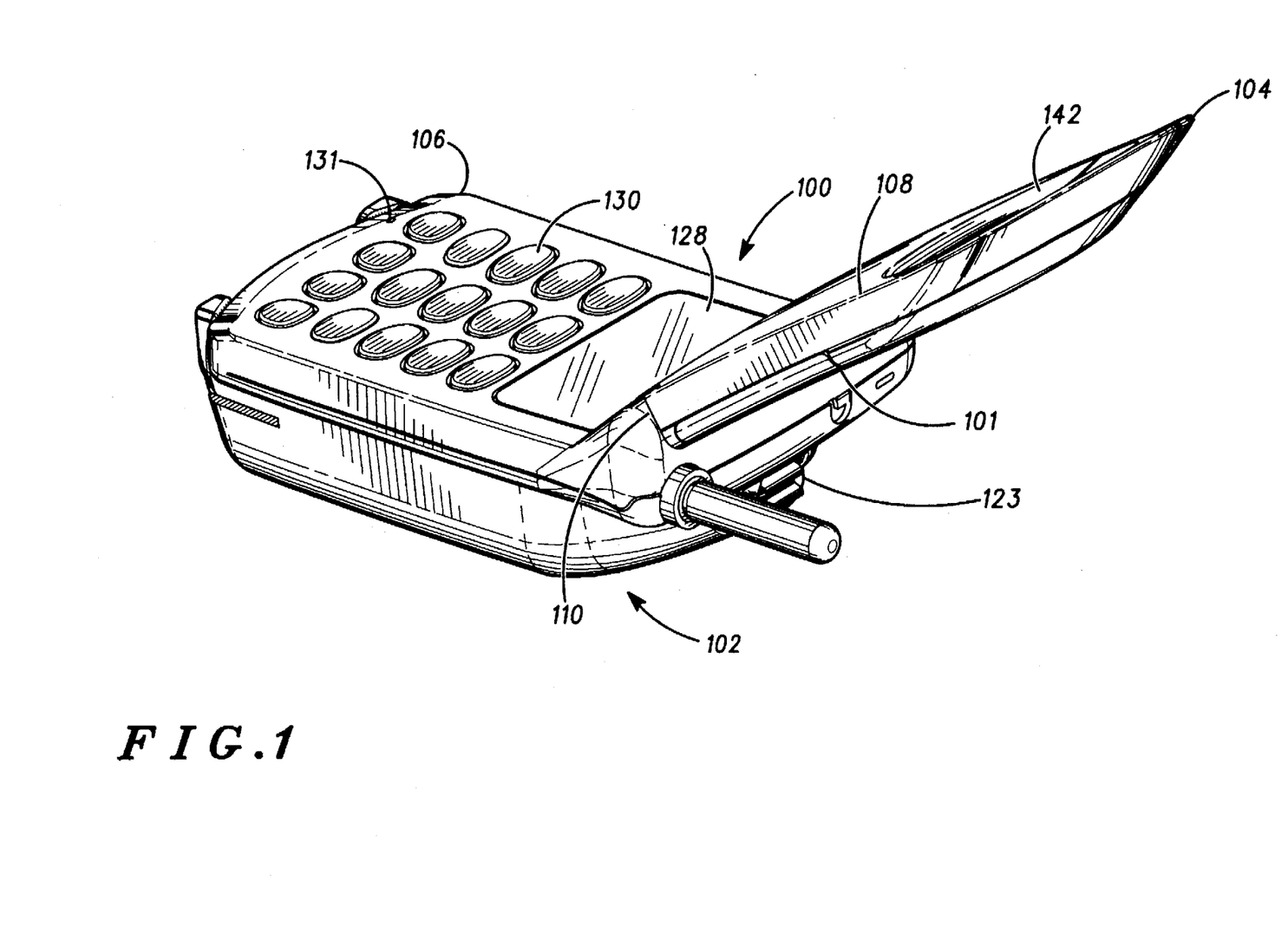
FIG. 1 is an illustration of a front, top, and right side perspective view of a portable device in an opened position with a main battery and an auxiliary battery attached thereto.
Figure 2:
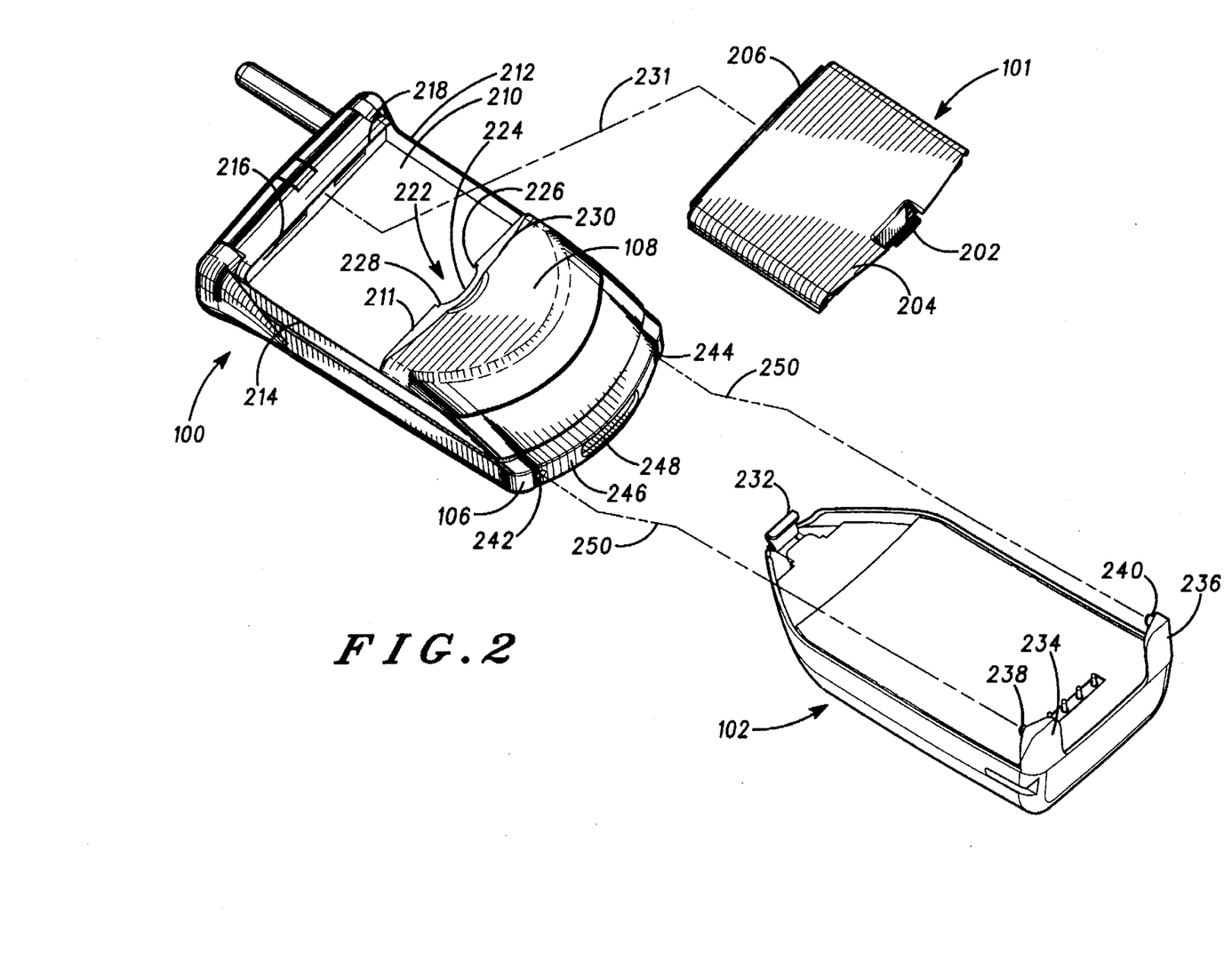
FIG. 2 is an illustration of a rear, top, and left side perspective view of a portable device in a closed position with the main battery and the auxiliary battery detached therefrom.
Figure 3:
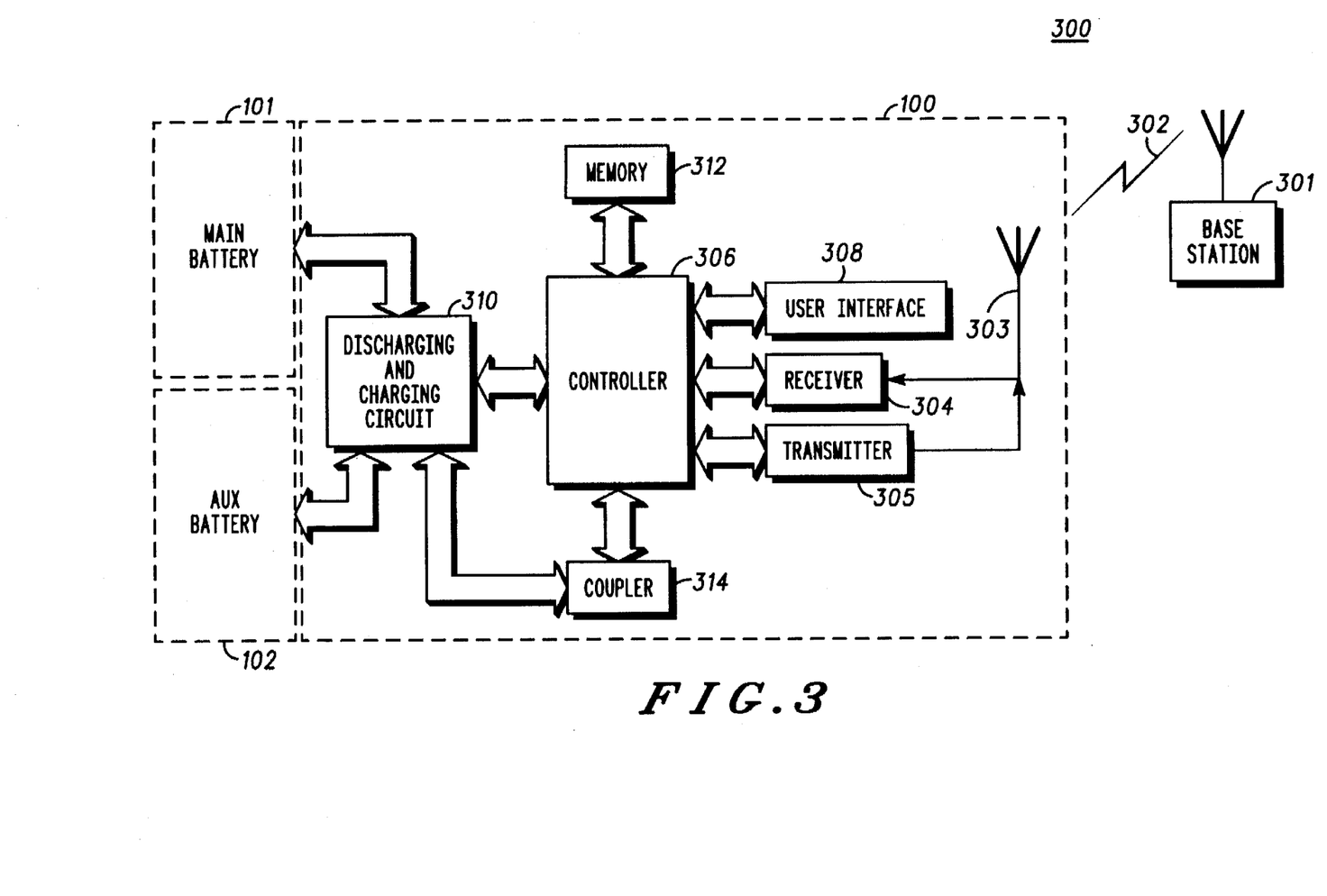
FIG. 3 is an illustration in block diagram form of a radio frequency communications system employing the portable device of FIG. 1, the portable device having a discharging and charging circuit.

In FIGS. 1, 2 and 3, the illustrated portable apparatus or device 100 is a portable cellular radiotelephone, which is powered by main and auxiliary batteries 101, 102 in an operating state. The main and auxiliary batteries 101, 102 include respective memories 402, 410 (see FIGS. 4 and 5) for storing a 64-bit registration number and 1024 bits of data for identifying the type and brand of such batteries which are known to be reliable and safe for both operating and charging modes of operation. Memories 402, 410 are preferably EPROM memories manufactured by Dallas Semiconductor of Dallas, Texas USA, which store a laser-engraved 64-bit registration number and 1024 bits of data. In order to uniquely identify the batteries 101, 102, the 64-bit registration number includes a twelve-bit brand code having a predetermined brand code value and an eight-bit type code having a predetermined type code value, and the 1024 bits of data include a unique multi-character message. By identifying the unique brand code, type code and multi-character message when a battery is inserted into portable device 100, it can be insured that the portable device 100 will be operated with a reliable and safe battery. Otherwise, the portable device is turned off and the battery is not charged.

FIG. 1 illustrates a portable device 100 having a main battery 101 and an auxiliary battery 102. The portable device 100, which is preferably a radiotelephone, includes a housing 104 having a lower housing portion 106 and an upper housing portion 108 rotatably coupled via a hinge 110. The lower housing portion 106 includes a retaining slot 123 for attaching the auxiliary battery 102, a display 128, a keypad 130, and a microphone opening 131. The display 128 provides visual information to a user including, for example, the current amount of charge remaining in the main battery 101 or the auxiliary battery 102. The keypad 130 allows the user to power on and off the portable device 100 and initiate calls by inputting and sending numbers. A microphone (not shown) is concealed behind the microphone opening 131. The housing portion 108 includes a speaker bezel 142 having openings with a speaker (not shown) positioned therebehind. Aside from providing speech to the user, the speaker may provide an audible alert when the main and auxiliary batteries 101, 102 near depletion. The lower and upper housing portions 106, 108 include the auxiliary and main batteries 101, 102 attached thereto. The main and auxiliary batteries 101, 102 are detachable from the portable device 100 as exemplified by FIG. 2.

FIG. 2 illustrates the portable device 100 in a closed position with the main and auxiliary batteries 101, 102 detached therefrom. The main battery 101 includes a latch member 202 disposed about a midpoint of a flange 204 that forms a first end of the main battery 101. A protrusion 206 is longitudinally disposed on a second end of the main battery 101 opposite the latch member 202. The portable device 100 includes a first recess 210 formed in the upper housing portion 108. The first recess 210 is formed of a front wall 211, a right wall 212, a left wall 214, and a rear wall 216. A lip 218 extends outward from the rear wall 216 and over the first recess 210. A mating latch member 222 includes shoulders 226, 228 and comprises a cutaway area 224 of the front wall 211. A second recess 230 of the upper housing portion 108 extends forward from, and above, the front wall 211. The main battery 101 is attached to the portable device by inserting the protrusion 206 of the main battery 101 beneath the lip 218 as shown by imaginary line 231 and rotating the main battery 101 downward into the first recess 210. The main battery 101 is rotated until the latch member 202 engages the shoulders 226, 228 of the mating latch member 222 and the flange 204 rests in the second recess 230. The main battery 101 is detached by depressing the latch member 202 away from the shoulders 226, 228 and rotating the main battery 101 upward and away from the first and second recesses 210, 230.

The auxiliary battery 102 includes a flexible hook latch 232 and fixed supports 234, 236 with posts 238, 240, respectively. The portable device 100 includes a retaining slot 123 of FIG. 1 and receptacles 242, 244 disposed on an end 246 of the lower housing portion 106 for attaching the auxiliary battery 102. The portable device 100 includes an elongated opening 248 disposed on a bottom end 246 of the lower housing portion 106 between the receptacles 242, 244. The elongated opening 248 provides access to a coupler 314 (see FIG. 3) disposed therein. The auxiliary battery 102 is attached by inserting the flexible hook latch 232 into the retaining slot 123; angularly extending the auxiliary battery 102 downward until the fixed supports 234, 236 clear the bottom end 246; rotating the auxiliary battery 102 until juxtaposed with the lower housing portion 106; and releasing the auxiliary battery 102 thereby allowing the fixed supports 234, 236 to move towards the bottom end 246 allowing posts 238, 240 to insert into receptacles 242, 244 as telegraphed by lines 250. The spacing of the fixed supports 234, 236 prevents obstruction of the elongated opening 248 and preserves access to the coupler 314 when the auxiliary battery 102 is attached. The auxiliary battery 102 is detached from the portable device 100 by substantially reversing the aforementioned steps of attachment.

Although portable device 100 is illustrated and described as a radiotelephone, it will be recognized that any one of a number of portable devices, such as lap top computers, camcorders, pagers, two way radios, personal digital assistants, and the like, could utilize the apparatus and method for discharging and charging a multiple battery arrangement as described hereinbelow.

FIG. 3 is an illustration in block diagram form of a radio frequency communications system 300 wherein a base station 301 and the portable device 100 communicate via radio frequency (RF) signals 302. The portable device 100 includes an antenna 303, a receiver 304, a transmitter 305, a controller 306, and a user interface 308 that includes the speaker (not shown), the display 128 of FIG. 1, the microphone (not shown), and the keypad 130 of FIG. 1. The controller 306 could be, for example, a 68HC11 microprocessor available from Motorola, Inc. The portable device 100 is powered by the detachable main and auxiliary batteries 101, 102 and operates in the following manner. The antenna 303 transduces the RF signals 302 into electrical RF receive signals and couples the electrical RF receive signals to the receiver 304. The receiver 304 transforms the electrical RF receive signals into data receive signals that are then coupled through the controller 306 and output to the user as audible speech via the speaker and as operational information via the display 128. Speech and data input by the user via the microphone and the keypad 130, respectively, are coupled to the transmitter 305 as data transmit signals. The transmitter 305 converts the data transmit signals into electrical RF transmit signals which are transduced by the antenna 303 and transmitted as the RF signals 302.

The portable device 100 includes a discharging and charging circuit 310, a memory 312, and a coupler 314. The discharging and charging circuit 310 selectively discharges the main and auxiliary batteries 101, 102 to supply uninterrupted power to the portable device 100. The discharging and charging circuit 310 also selectively charges the main and auxiliary batteries 101, 102 under the control of a program executed by the controller 306. The program is stored in the memory 312. The memory 312 is preferably a read-only memory (ROM), but could be an erasable programmable read-only memory (EPROM), a random-access memory (RAM), or other suitable memory portable device. Although the memory 312 is shown separate from the controller 306, it will be recognized that the memory 312 could be internal to the controller 306 and/or that the controller 306 may contain other memory in addition to memory 312. The coupler 314 permits a user to attach an external power supply 430 (see FIG. 4) thereto for providing power to operate the portable device 100 (and save battery charge) or charge the main and auxiliary batteries 101, 102.

Figure 4:
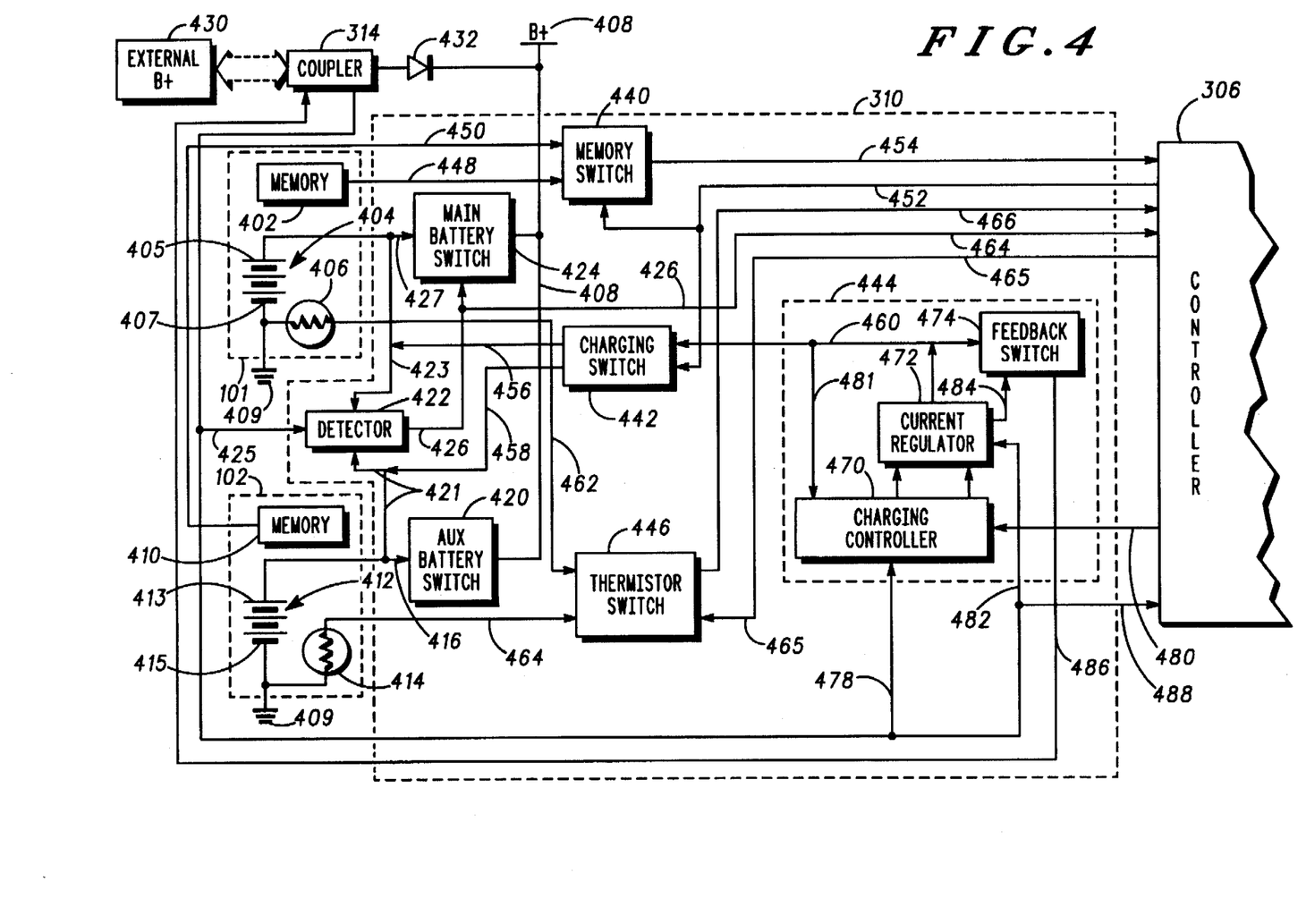
FIG. 4 is an illustration in block diagram form of the discharging and charging circuit of FIG. 3.

FIG. 4 further illustrates, in block diagram form, the main and auxiliary batteries 101, 102, the discharging and charging circuit 310, the coupler 314, and the controller 306. The main and auxiliary batteries 101, 102 are detachably coupled to the discharging and charging circuit 310. The main battery 101 includes a main electrochemical cell 404, a main memory device 402, and a main thermistor device 406. In some cases, the main battery 101 may also include additional circuitry for protecting the electromechanical cell 404. It will be recognized that the main electrochemical cell 404, as illustrated, represents one or a plurality of inter-coupled electrochemical cells for producing a predetermined output voltage. The main electrochemical cell 404 includes a main positive terminal 405 and a main negative terminal 407. The main electrochemical cell 404 is preferably rechargeable. The main electrochemical cell 404 is preferably one of the following types: Nickel-Cadmium (NiCd), Nickel-Metal Hydride (NiMH), Alkaline, or Lithium Ion. The main memory 402 is preferably an EPROM. The main memory 402 characterizes the main battery 101 as a "smart battery" because the main memory 402 stores data that may be used to optimize discharging and charging. Such data includes battery type data, discharge/charge hysteresis data, and history data. The main thermistor 406 is coupled to the main negative terminal 407 and is thermally coupled to the main cell 404 for indicating the temperature of the main electrochemical cell 404 via a voltage drop thereacross. The main negative terminal 407 is further coupled to an electrical ground 409.

The auxiliary battery 102 is similar to the main battery 101 and includes an auxiliary memory device 410, an auxiliary electrochemical cell 412 having an auxiliary positive terminal 413 and an auxiliary negative terminal 415, and an auxiliary thermistor device 414. It will be recognized that the auxiliary electrochemical cell 412, as illustrated, represents one or more inter-coupled electrochemical cells for producing a predetermined output voltage. The auxiliary negative terminal 415 is similarly coupled to the electrical ground 409. In the preferred embodiment, however, the auxiliary battery 102 has a larger capacity than the main battery 101 and is capable of providing power for longer periods of time.

A discharging portion of the discharging and charging circuit 310 switchably connects the main and auxiliary batteries 101, 102 to a portable device power supply line 408 (denoted as B+). The main and auxiliary batteries 101, 102 supply the portable device power supply line 408 with a voltage between 2.8 V and 5.5 V. The portable device power supply line 408 powers the controller 306, the receiver 304 of FIG. 3, the transmitter 305 of FIG. 3, the user interface of FIG. 3, and other components of the portable device 100 via electrical connections (not shown). The discharging portion primarily includes an auxiliary battery switch 420, a detector 422, and a main battery switch 424. The auxiliary battery switch 420 is solely associated with the auxiliary battery 102 and operates to connect the auxiliary battery 102 to power the portable device 100. An input of the auxiliary battery switch 420 is coupled to the auxiliary positive terminal 413 by line 416. An output of the auxiliary battery switch 420 is coupled to the portable device power supply line 408.

The detector 422 is coupled between the main and auxiliary batteries 101, 102 and detects when the auxiliary battery 102 has discharged below a threshold level and when an external power supply 430 has been attached to the portable device 100. In the preferred embodiment, the threshold voltage is 3.3 V. The auxiliary positive terminal 413 is coupled to a first input of the detector 422 via line 421. The main positive terminal 405 is coupled to a second input of the detector 422 via line 423. The coupler 314 is coupled to a third input of the detector 422 via line 425. An output of the detector 422 is coupled to the main battery switch 424 and the controller 306 via line 426.

The main battery switch 424, responsive to the detector 422, connects or disconnects the main battery 101 as a power source from which the portable device 100 can operate. A first input of the main battery switch 424 is coupled to the output of the detector 422 via line 426. A second input of the main battery switch 424 is coupled to the main positive terminal 405 via line 427. An output of the main battery switch 424 is coupled to the portable device power supply line 408.

The controller 306 further couples the output of the detector 422 to the user interface 308 of FIG. 3. The user interface 308 interprets the output of the detector 422 and informs the user as to which of the main and auxiliary batteries 101, 102 is powering the portable device 100 at a particular time.

The discharging portion of the discharging and charging circuit 310 discharges the main and auxiliary batteries 101, 102 according to a predetermined priority—when both batteries are attached, the auxiliary battery 102 is discharged first. The auxiliary battery switch 420 initially couples the auxiliary positive terminal 413 to the portable device power supply line 408, thereby powering the portable device 100 via the auxiliary battery 102. The detector 422 monitors the auxiliary electrochemical cell 412 while it discharges. When a voltage of the auxiliary positive terminal 413 falls below a threshold voltage, the detector 422 closes the main battery switch 424. This connects the main positive terminal 405 to the portable device power supply line 408, thereby powering the portable device 100 via the main battery 101.

While one battery is in-use, i.e., providing power, the other battery that is not in-use can be replaced (detached and re-attached) without interruption to the operation of the portable device 100. While the auxiliary battery 102 is in-use, the main battery 101 can be replaced. While the main battery 101 is in-use, the auxiliary battery 102 can be replaced. Upon replacement of the auxiliary battery 102, the detector 422 opens the main battery switch 424 (and disconnects the main battery 101) if the voltage of the auxiliary positive terminal 413 is above the threshold voltage.

Also, the in-use battery can be detached without interrupting the operation of the portable device 100. If the auxiliary battery 102 is detached while in-use, the detector 422, responsive to the rapidly decreasing voltage on line 421, closes the main battery switch 424 quickly enough to prevent interruption. Interruption is also prevented when the main battery 101 is detached while in-use, even after the auxiliary battery 102 has already discharged to the threshold voltage. This is accomplished by setting the threshold voltage (e.g., 3.3 V) above a minimal voltage that is necessary to power the portable device 100. In the preferred embodiment, the minimal voltage is 2.8 V. Also, the auxiliary battery switch 420 must be modeled so that it remains closed even after the auxiliary battery 102 has discharged to the threshold voltage. Therefore, upon detachment of the main battery 101 while in-use, the auxiliary battery 102 is still able to provide enough power to operate the portable device 100 (at least for a short time). Also, the detector opens the battery control switch 424 when the presence of the main positive terminal 405 is no longer detected at the second input thereof.

Such detachment of the in-use battery is an advantageous feature to users who wish to replace the in-Use battery during a phone call without dropping the phone call. In the preferred embodiment, the main battery 101 is smaller than the auxiliary battery 102 (see FIGS. 1 and 2) and, thus, more portable. It is therefore envisioned that users will carry more main batteries than auxiliary batteries on their person. The ability to replace the main battery 101 while it is in-use in therefore advantageous.

When an external power supply 430 (denoted as EXTERNAL B+) is attached to the coupler 314, the discharging of the main battery 101 or auxiliary battery 102 is stopped and the portable device 100 is powered via the external power supply 430. The external power supply 430 supplies the portable device power supply line 408 with a voltage that is approximately 1.4 V higher than the voltage provided by the main and auxiliary batteries 101, 102. Upon attachment, diode 432, which is coupled between the coupler 314 and the portable device power supply line 408, becomes forward biased and couples the voltage supplied by the external power supply 430 to the portable device power supply line 408 (When the external power supply 430 is not attached, diode 432 prevents the main and auxiliary batteries 101, 102 from draining back into the coupler 314.). In response to the higher voltage level on the portable device power supply line 408, the auxiliary battery switch 420 opens and discharging of the auxiliary battery 102 stops. The detector 422, upon detecting the presence of the external power source 430 (via the third input) opens the main battery switch 424 and discharging of the main battery 101 stops.

A charging portion of the discharging and charging circuit 310 selectively charges the main and auxiliary batteries 101, 102. The charging portion of the discharging and charging circuit 310 includes a memory switch 440, a charging switch 442, an internal charger 444, and a thermistor switch 446. The charging portion of the discharging and charging circuit 310 operates under the control of the controller 306.

The controller 306 selectively reads the contents of the main and auxiliary memories 402, 410 via the memory switch 440. The main memory 402 is coupled to a first input of the memory switch 440 via data bus line 448. The auxiliary memory 410 is coupled to a second input of the memory switch 440 via data bus line 450. The controller 306 is coupled to a third input of the memory switch 440 via line 452. The memory switch 440 includes an output that is coupled to the controller 306 via line 454. The controller 306 signals the memory switch 440 via line 452 to connect either the main memory 402 or the auxiliary memory 410 to the controller 306 via the output of the memory switch 440 and line 454. Once the connection is establish, the controller 306 reads the battery data.

The controller 306 selects either the main battery 101 or the auxiliary battery 102 to charge via the charging switch 442. The charging switch 442 includes a first output that is coupled to the main electrochemical cell 404 via line 456. The charging switch 442 includes a second output that is coupled to the auxiliary electrochemical cell 412 via line 458. The internal charger 444 is coupled to a first input of the charging switch 442 via line 460. The controller 306 is coupled to a second input of the charging switch 442 via line 452. The controller 306 signals the charging switch 442 via line 452 to connect the internal charger 444 via the first input of the charging switch and line 460 to either the main electrochemical cell 404 or the auxiliary electrochemical cell 412. Once connected a charging current provided by the internal charger 444 charges the main electrochemical cell 404 or the auxiliary electrochemical cell 412.

The controller 306 determines the presence of the main and auxiliary batteries 101, 102 via the thermistor switch 446. The main thermistor 406 is coupled to a first input of the thermistor switch 446 via line 462. The auxiliary thermistor 414 is coupled to a second input of the thermistor switch 446 via line 464. The controller 306 is coupled to a third input of the thermistor switch 446 via line 465. The thermistor switch 446 includes an output that is coupled to the controller 306 via line 466. The controller 306 signals the thermistor switch 446 via line 464 to connect either the main thermistor 406 or the auxiliary thermistor 414 to the controller 306 via the output of the thermistor switch and line 466. Once connected, the controller 306 determines the presence of the main battery 101 or the auxiliary battery 102 by a voltage drop across the respective thermistor.

The internal charger 444 includes a charging controller 470, a current regulator 472, and a feedback switch 474. The charging controller 470 is coupled to the coupler 314 via line 478, the controller 306 via line 480, and the charging current via line 481. The charging controller 470 responsive to the coupler 314, the controller 306, and the charging current, outputs a current signal to the current regulator 472. Besides having inputs for receiving the current from the charging controller 470, the current regulator 472 includes an input that is coupled to the coupler 314 via line 482. The current regulator 472, responsive to the current, outputs the charging current at a first or second rate to the charging switch 442 via line 460. Upon outputting the charging current, the current regulator 472 closes the feedback switch 474 via line 484. The feedback switch 474, once closed, couples the charging voltage on line 460 to the coupler 314 via line 486. The charging voltage is used for tracking by the external power supply 430.

The charging portion of the discharging and charging circuit 310 charges the main and auxiliary batteries 101, 102 according to a predetermined priority—when both batteries are attached, the main battery 101 is charged first. Charging is commenced upon attachment of an external power source capable of charging batteries, such as the external power supply 430, to the coupler 314. The controller 306, sensing attachment of the external power supply 430 via line 488, switches between the main and auxiliary thermistors 406, 414 via the thermistor switch 446 to determine which batteries are present. If both the main and auxiliary batteries 101, 102 are attached, the controller 306 switches the memory switch 440 and reads the data from the main memory 402 via line 454. The external power supply 430 feeds the charging controller 470 via line 478. The controller 306 configures the charging controller 470 via line 480 so that the charging controller 470 supplies a current signal in accordance with the data read from the main battery 101. Feedback is provided on line 481 so that to the charging controller 470 can adjust the current signal, if necessary. The current regulator 472, responsive to the current signal from the charging controller 470, generates the charging current using the external power supply 430 provided via line 482.

The current regulator 470 outputs the charging current to the charging switch 442 via line 460. The controller 306 switches the charging switch 442 to couple the charging current to the main electrochemical cell 404 via line 456. The main battery 101 is charged for a period according to charging data read from the main memory 402. After being charged for this period, the main battery 101 is deemed full.

Once the main battery 101 is fully charged, charging of the auxiliary battery 102 is commenced. The controller 306 switches the memory switch 440 and reads battery data from the auxiliary memory 410. The controller 306 configures the internal charger 444 to output the charging current in accordance with the data read from the auxiliary battery 102. The controller 306 switches the charging switch 442 to couple the charging current to the auxiliary electrochemical cell 412 via line 416. The auxiliary battery 102 is charged for a period according to optimum charging time data read from the auxiliary memory 410 and then deemed full. If the main battery 101 is replaced while the auxiliary battery 102 is being charged, the controller 306 (which continually toggles the thermistor switch 446 between the main and auxiliary thermistors 406, 414 to determine battery presence during charging) interrupts charging of the auxiliary battery 102 and commences charging of the main battery 101 in the aforementioned manner. Once both the main and auxiliary batteries 101, 102 are full, the internal charger 444 repeatedly applies a maintenance charge to each of the main and auxiliary batteries 101, 102 for a period of approximately 1800 seconds. Maintenance charging consists of trickle charge or topping off to retard battery decay. Charging ends upon detachment of the external power supply 430.

Although the portable device 100 includes an internal charger 444 for charging the multiple battery arrangement, it will be recognized that the charging means of the main and auxiliary batteries 101, 102 could be external to the portable device 100. For example, without the internal charger 444, charging of the main and auxiliary batteries 101, 102 could be accomplished via an external charger attached to the coupler 314. Aside from being coupled to the controller 306, the coupler 314 would also be coupled directly to the thermistor switch 446, the memory switch 440, and the charging switch 442. Upon attachment of the external charger, battery presence is determined via the thermistor switch 446, battery data is read from either the main memory 402 or auxiliary memory 410, and charging current based on the battery data is supplied to main battery 101 or the auxiliary battery 102 via the charging switch 442.

Figure 5:
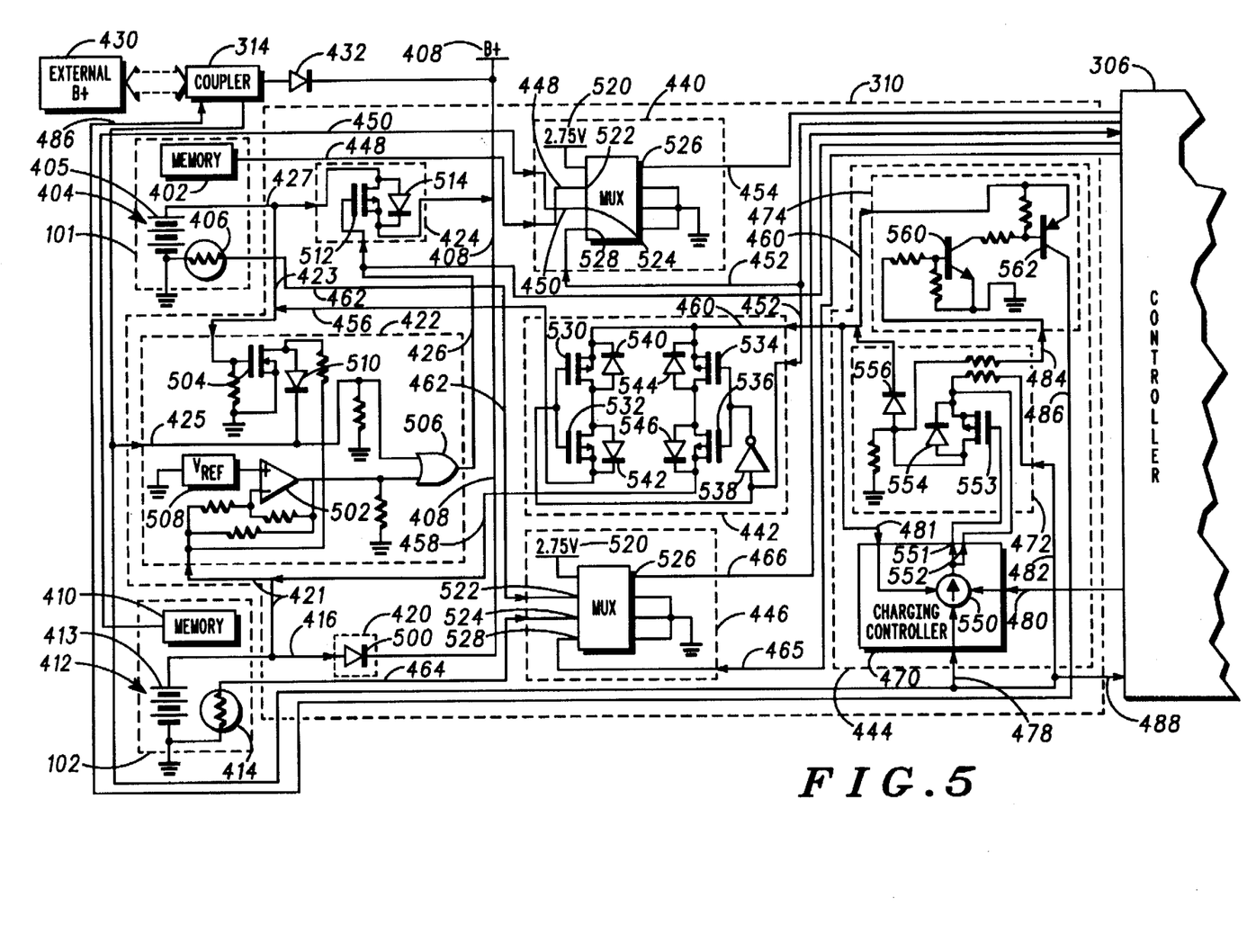
FIG. 5 is an illustration in partial schematic form of the discharging and charging circuit of FIG. 3.

FIG. 5 is an illustration in partial schematic form of the discharging and charging circuit 310. As stated, discharging the main and auxiliary batteries 101, 102 is accomplished by the auxiliary battery switch 420, the detector 422, and the main battery switch 424. The auxiliary battery switch 420 comprises diode 500, which is preferably a Schottky rectifier. The input of diode 500 is coupled to the auxiliary positive terminal 413 via line 416. The output of diode 500 is coupled to the portable device power supply line 408.

The detector 422 primarily includes a comparator 502, transistor 504, diode 510, and an OR gate 506. The comparator 502 has a reference voltage 508 (denoted VREF) set to the threshold voltage of the auxiliary battery 102 and coupled to a positive (+) terminal thereof. The auxiliary positive terminal 413 is coupled to a negative (−) terminal of the comparator 502 via line 421. The output of the comparator 502 is coupled to a first input of the OR gate 506. A gate of transistor 504, which is preferably an n-channel MOSFET, is coupled to the main positive terminal 405 via line 423. A drain of transistor 504 is coupled to the auxiliary positive terminal 413 and to a second input of the OR gate 506. Diode 510 is coupled between the drain of the transistor 504 and the OR gate 506. The second input of the OR gate 506 is also coupled to the coupler 314. The output of the OR gate 506 is coupled to the main battery switch 424 via line 426.

The main battery switch 424 includes transistor 512, which is preferably a p-channel enhancement mode MOSFET, and diode 514. A gate of transistor 512 is coupled to the output of the OR gate 506 via line 426. A drain of transistor 512 is coupled to the main positive terminal 405 via line 427. A source of transistor 512 is coupled to the portable device power supply line 408. Diode 514 is coupled between the source and drain of transistor 512.

When the main and auxiliary batteries 101, 102 are attached (and the external power supply 430 is not attached), diode 500 is forward biased and couples the auxiliary positive terminal 413 to the portable device power supply line 408. If the voltage level of the auxiliary positive terminal 413 is greater than or approximately equal to the reference voltage 508, the comparator 502 outputs a logic high signal. This causes the OR gate 506 to output a logic high signal on line 426. This, in turn, causes transistor 512 to turn off, thereby, preventing the main positive terminal 405 from supplying the portable device power supply line 408. Diode 514 prevents current from the portable device power supply line 408 from draining back and charging the main battery 101.

If the voltage level of the auxiliary positive terminal 413 falls below the reference voltage 508, the comparator 502 outputs a logic low signal to the OR gate 506. This causes the OR gate 506 to output a logic low signal on line 426. If both the main and auxiliary batteries 101, 102 are still present, transistor 504 also outputs a logic low signal to the OR gate 506. This causes the OR gate 506 to output a logic low signal on line 426. And, in turn, causes transistor 512 to turn on and couple the main positive terminal 405 to the portable device power supply line 408.

If the main battery 101 is detached (and the auxiliary battery 102 is attached), the gate of transistor 504 will no longer see, i.e., be supplied by, the main positive terminal 405. This results in the drain of transistor 504 being pulled high by the auxiliary positive terminal 413. This, in turn, causes the OR gate 506 to output the logic high signal on line 426 and transistor 512 to remain off.

When the external power supply 430 is attached to the coupler 314, the main and auxiliary batteries 101, 102 stop discharging. Upon attachment, the presence of the external power supply 430 on line 425 causes the OR gate 506 to output the logic high signal on line 426. This causes transistor 512 to turn off. Diode 510 prevents current from the external power supply 430 from draining back and charging the main battery 101. The higher voltage supplied on the portable device power supply line 408 by the external power supply 430 prevents forward biasing of diode 500.

As stated, to accomplish charging of the main and auxiliary batteries 101, 102 the discharging and charging circuit 310 includes the memory switch 440; the charging switch 442; the charging controller 470, the current regulator 472, and the feedback switch 474 of the internal charger 444; and the thermistor switch 446. The memory and thermistor switches 440, 446 are preferably two channel multiplexer/demultiplexers that are powered by a 2.75 V supply 520. Each one of the memory and thermistor switches 440, 446 primarily includes first and second channel ports 522, 524 coupled to lines 448, 464 and lines 450, 462, respectively; a communication port 526 coupled to lines 454, 466; and a select port 528 coupled to lines 452, 465. A logic low signal coupled to the select port 528 from the controller 306 couples the first channel port 522 (connected to the main battery 101) to the communication port 526 and further on to the controller 306. A logic high signal coupled to the select port 528 from the controller 306 couples the second channel port 524 (connected to the auxiliary battery 102) to the communication port 526 and further on to the controller 306.

The charging switch 442 includes transistors 530, 532, 534, 536. Transistors 530, 532, 534, 536 are preferably p-channel enhancement mode MOSFETs. Gates of transistors 530, 532 are coupled to line 452. Gates of transistors 534, 536 are coupled to line 452 via an inverter gate 538. Sources of transistors 530, 534 are coupled to line 460. Sources of transistors 532, 536 are coupled to the main and auxiliary positive terminals 405, 413 via lines 456, 458, respectively. Drains of transistors 530, 532 are tied together. Drains of transistors 534, 536 are tied together. Diodes 540, 542, 544, 546 are coupled to transistors 530, 532, 534, 536, respectively, from drain to source. A logic low signal on line 452 switches on transistors 534, 536 so charging current on line 460 can flow to the main battery 101. A logic high signal on line 452 switches on transistors 530, 532 so charging current on line 460 can flow to the auxiliary battery 102. Diodes 540, 542, 544, 546 prevent the charging current from flowing to the battery not selected for charging.

The charging controller 470, which is preferably an integrated circuit, consists primarily of a controlled current source 550, such as a pulse width modulator (PWM), that generates an output current signal at a level determined by the charging controller 470. The current source 550 is fed by the coupler 314 via line 478 at a first input port, configured by the controller 306 via line 480 at a second input port, and adjusted via line 481 at a third input port. The charging controller 470 couples a current signal generated by the current source 550, responsive to the controller 306 and adjustments based on the feedback received via 481, to the current regulator 472 via an output port 551 and a sense port 552.

The current regulator 472 includes primarily transistor 553, diode 554, and diode 556. Transistor 553 is preferably a p-channel enhancement mode MOSFET. A gate of transistor 553 is coupled to the output port 551 of the charging controller 470. A source of transistor 553 is coupled to the sense port 552 of the charging controller 470 and the coupler 314 (and the external power supply 430) via line 482. A drain of transistor 553 is output to the feedback switch 474 via line 484 and output to line 460 via diode 556. Transistor 552, responsive to the charging signal received from the output port 551 of the charging controller 470, turns on and couples current generated by the external power supply 430 and the current source 550 (the charging signal provided via the sense port 552 of the charging controller 470) to line 460 via diode 556. Diode 556 is preferably a Schottky rectifier. Diode 554 is coupled to transistor 553 from drain to source and prevents the charging current from flowing to line 460 when transistor 553 is off.

The feedback switch 474 primarily includes transistors 560, 562. Transistor 560, 562 are preferably bipolar junction transistors. Transistor 560 is an npn transistor. A base of transistor 560 is coupled to the current regulator 472 via line 484. A collector of transistor 560 is coupled to a base of transistor 562. Transistor 560 turns on responsive to the charging current generated by the current regulator 472. Transistor 562 is a pnp transistor. An emitter of transistor 562 is coupled to line 460. A collector of transistor 562 is coupled to the coupler 314 via line 486. Transistor 562 couples the charging voltage output by the current regulator 472 to the coupler 314 when transistor 560 is on. This allows the external power supply 430 to track the charging voltage.

Figure 6:
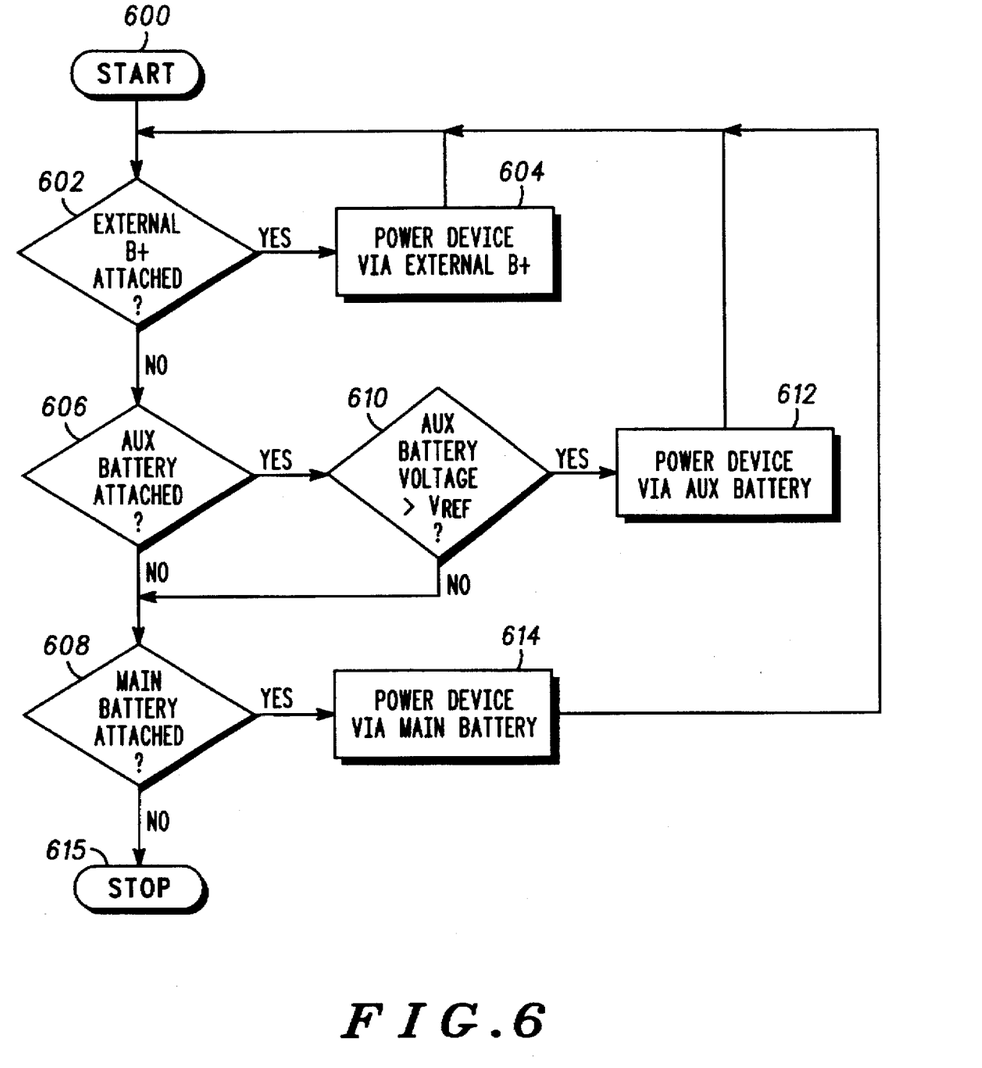
FIG. 6 is an illustration in flow chart form of a method of discharging the main battery and the auxiliary battery.

FIG. 6 is an illustration in flow chart form of a method of discharging the main and auxiliary batteries 101, 102 of FIGS. 1-5. In the preferred embodiment, this method or process is implemented solely by the auxiliary battery switch 420, the detector 422, and the main battery switch 424 of the discharging and charging circuit 310 of FIGS. 4 and 5. It will be recognized, however, that this method may also be implemented by microprocessor or controller executed software program.

The process is initiated at block 600. At decision block 602, it is determined whether or not the external power supply 430 of FIGS. 4 and 5 is attached to the portable device 100 of FIGS. 1-3. If the external power supply 430 is attached, the portable device 100 is powered via the external power supply 430 at block 604 and the process is returned to decision block 602. If the external power supply 430 is not attached, the process proceeds to decision block 606.

At decision block 606, it is determined whether or not the auxiliary battery 102 of FIGS. 1-5 is attached to the portable device 100. If the auxiliary battery 102 is not attached, the process proceeds to decision block 608. If the auxiliary battery 102 is attached, it is determined whether or not the voltage of the auxiliary battery 102 is greater than the reference voltage 508 of FIG. 5 at decision block 610. If the voltage of the auxiliary battery 102 is greater, the portable device 100 is powered via the auxiliary battery 102 at block 612 and the process is returned to decision block 602. If the voltage of the auxiliary battery 102 is not greater, the process proceeds to decision block 608.

At decision block 608, it is determined whether or not the main battery 101 of FIGS. 1-5 is attached. If the main battery 101 is attached, the portable device 100 is powered via the main battery 101 at block 614 and then the process is returned to decision block 602. If the main battery 101 is not attached, the process stops at block 615 because no power providing sources are attached to the portable device 100.

Figure 7:
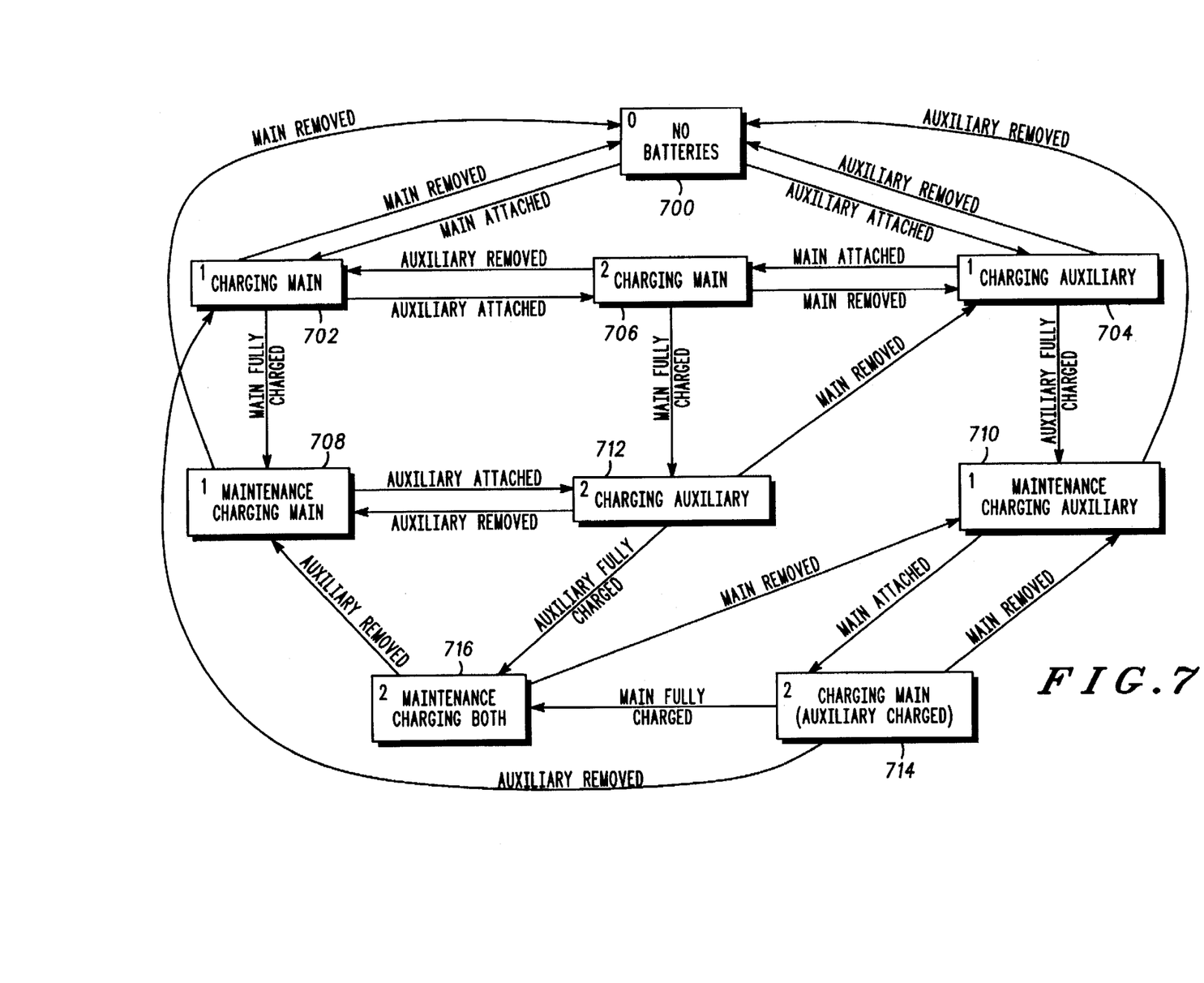
FIG. 7 is an illustration in state diagram form of a method of charging the main battery and the auxiliary battery.

FIG. 7 is an illustration in state diagram form of a method of charging the main and auxiliary batteries 101, 102 of FIGS. 1-5. In the preferred embodiment, this method or process is implemented using a software program executed by the controller 306 of FIGS. 3-5. In accordance with the program, the controller 306 operates the memory switch 440, the charging switch 442, the internal charger 444, and the thermistor switch 446 of the discharging and charging circuit 310 of FIGS. 4 and 5 to charge the main and auxiliary batteries 101 and 102. It will be recognized, however, that this method may be implemented using only discrete hardware components. Each state is represented by a block. The number in the upper left corner of each of the blocks indicates the number of batteries attached to the portable device 100 of FIGS. 1-3 during that state.

Block 700 indicates a state in which no batteries are attached. If the main battery 101 is attached to the portable device 100 at block 700, the process moves to block 702. If the auxiliary battery 102 is attached at block 700, the process moves to block 704.

Block 702 indicates a state in which only the main battery 101 is attached and charging. If the main battery 101 is removed at block 702, the process moves to block 700. If the auxiliary battery 102 is attached at block 702, the process moves to block 706. If the main battery 101 becomes fully charged at block 702, the process moves to block 708.

Block 704 indicates a state in which only the auxiliary battery 102 is attached and charging. If the auxiliary battery 102 is removed at block 702, the process moves to block 700. If the main battery 101 is attached at block 704, the process moves to block 706. If the auxiliary battery 102 becomes fully charged at block 704, the process moves to block 710.

Block 706 indicates a state in which both the main and auxiliary batteries 101, 102 are attached and the main battery 101 is charging. If the main battery 101 is removed at block 706, the process moves to block 704. If the auxiliary battery 102 is removed at block 706, the process moves to block 702. If the main battery 101 becomes fully charged at block 706, the process moves to block 712.

Block 708 indicates a state in which only the main battery 101 is attached and maintenance charging. If the main battery 101 is removed at block 708, the process moves to block 700. If the auxiliary battery 102 is attached at block 708, the process moves to block 712.

Block 710 indicates a state in which only the auxiliary battery 102 is attached and maintenance charging. If the auxiliary battery 102 is removed at block 710, the process proceeds to block 700. If the main battery 101 is attached at block 710, the process proceeds to block 714.

Block 712 indicates a state in which both the main and auxiliary batteries 101, 102 are attached and the auxiliary battery 102 is charging. If the main battery 101 is removed at block 712, the process proceeds to block 704. If the auxiliary battery 102 is removed at block 712, the process moves to block 708. If the auxiliary battery 102 becomes fully charged at block 712, the process moves to block 716.

Block 714 indicates a state in which both the main and auxiliary batteries 101, 102 are attached, the main battery 101 is charging, and the auxiliary battery 102 is fully charged. If the main battery 101 is removed at block 714, the process moves to block 710. If the auxiliary battery 102 is removed at block 714, the process proceeds to block 702. If the main battery 101 becomes fully charged at block 714, the process moves to block 716.

Block 716 indicates a state in which both the main and auxiliary batteries 101, 102 are attached and maintenance charging. If the main battery 101 is removed at block 716, the process proceeds to block 710. If the auxiliary battery 102 is removed at block 716, the process proceeds to block 708.

Figure 8:
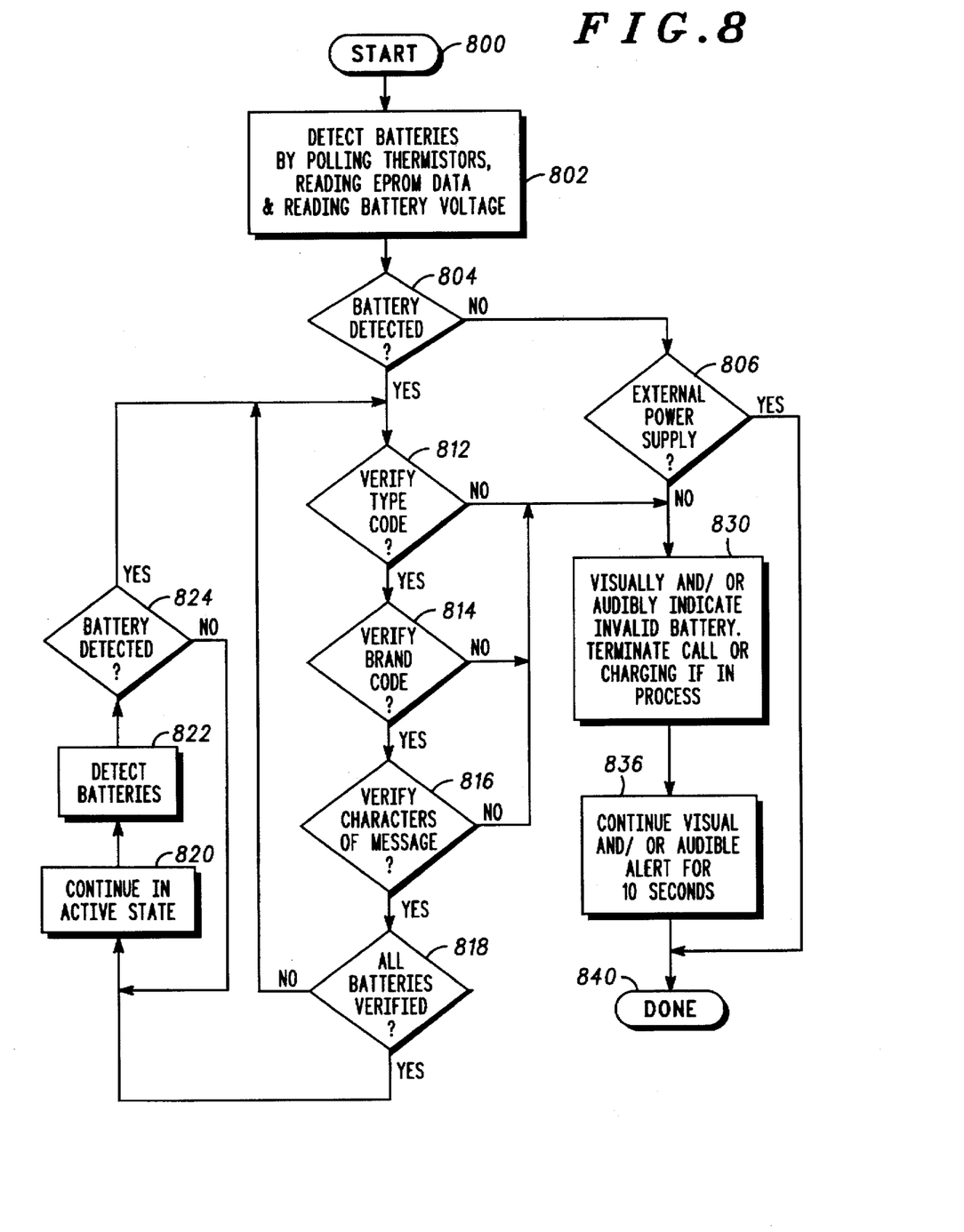
FIG. 8 is an illustration in flow chart form of a method of validating the main battery and the auxiliary battery.

FIG. 8 is an illustration in flow chart form of a method of validating the main and auxiliary batteries 101, 102 of FIGS. 1-5, when the portable device 100 is powered on, when a battery is inserted into the portable device 100, when the portable device 100 is coupled to external supply 430, or when the portable device 100 or a battery 101, 102 is coupled to an external charger device. In the preferred embodiment, this method or process is implemented by microprocessor or controller executed software program.

Assuming power has just been turned on by pressing the power key of the portable device 100 and placing it in an operating state, the process is initiated at block 800. Then at block 802, main and auxiliary batteries 101, 102 are detected by polling to see if respective thermistors 406, 414 are present, reading the data from the EPROM memories 402, 410, and reading by way of analog-digital converters the voltage of each of the main and auxiliary batteries 101, 102. The thermistors 406, 414 may be individually polled to determine if the respective main or auxiliary batteries 101, 102 are present.

The data read out of EPROM memories 402, 410 includes a 64-bit registration number and 1024 bits of data related to the type of battery and it operating and charging specifications. The 64-bit registration number is laser engraved into EPROM memories 402, 410, and includes an eight-bit CRC, a twelve-bit brand code having a predetermined value, a thirty-six bit serial number code and an eight-bit type code. The 1024 bits of data is divided into four pages of 256 bits each. Each page includes a data checksum, a battery identification code and related charging and discharging parameters that pertain to a particular type of battery, such as for example nickel-cadmium (NiCd), nickel-metal hydride (NiMH), alkaline, or lithium ion batteries. The first page contains data for FDMA portable devices, the second page data for TDMA portable devices, the third page data for desktop chargers, and the fourth page data for a predetermined multi-character message. In the preferred embodiment, the predetermined message is:

"COPR1996MOTOROLA_E.P._CHARGE_ONLY".

Next the process moves to block 804, where a check is made to see if either the main or auxiliary batteries 101, 102 were detected. If not, NO branch is take to block 806 where a check is made to see if the external power supply 430 is detected. The external power supply 430 is detected by measuring its voltage is read by way of an analog-digital converter. If so, YES branch is taken to block 840 to complete the process.

If the external power supply 430 is not detected at block 806, NO branch is taken to block 830, where a visual and/or audible indication is provided to alert the user that an invalid battery has been detected. If portable device 100 is powered on, the notice "BAD BAT" is placed in the display when the main battery 101 has not been detected, and the notice "BAD AUX" is placed in the display when the auxiliary battery 102 has not been detected. The portable device 100 will also provide an audible alert by sounding a tone. If a telephone call is in process, the portable device 100 will terminate that call in an orderly fashion by sending a call terminating message to the cellular base station. If the portable device 100 is in the desktop charger, the desktop charger will flash the red LED to provide the visual indication of detection of an invalid battery. Then at block 836, the portable device 100 will continue to sound a bad-battery indication tone for ten seconds. If the portable device is in the desktop charger, the desktop charger will continue to flash the red LED for ten seconds. Thereafter, at block 840, the portable device 100 will power down if it was in the power on or operating state. If the portable device is in the desktop charger, the desktop charger will discontinue charging the main or auxiliary bakeries 101, 102.

Returning to block 804, if one of the main or auxiliary batteries 101, 102 was detected, then YES branch is taken to block 812, where the twelve-bit type code is checked to verify that it has a predetermined type code. If not, NO branch is taken to block 830 to treat the battery with the wrong product type code as an invalid battery.

If the type code is verified to have the predetermined type code at block 812, YES branch is taken to block 814, where the brand code is checked to verify that it has a predetermined brand code. If not, NO branch is taken to block 830 to treat the battery with the wrong brand code as an invalid battery.

If the brand code is verified to have the predetermined brand code at block 814, YES branch is taken to block 816, where the data in the fourth page is checked to verify that it has each character of the predetermined multi-character message except the "1996" characters. If not, NO branch is taken to block 830 to treat the battery with the wrong message as an invalid battery.

If the data in the fourth page is verified to have each character of the predetermined multi-character message at block 816, YES branch is taken to block 818, where a check is made to determine if all batteries have been verified. If not, NO branch is taken to block 812 to repeat steps 812, 814 and 816 for the other battery. If all batteries have been verified, the process moves to block 820, where the active state is continued, the operating state if the portable device is powered on, or the charging state of the battery is continued by the charging circuit 310 or desktop charger. Next, at block 822, newly inserted batteries 101, 102 are detected by polling to see if respective thermistors 406, 414 are present, reading the data from the EPROM memories 402, 410, and reading by way of analog-digital converters the voltage of each of the main and auxiliary batteries 101, 102. If only one battery 101, 102 was inserted into, or one of the two batteries is removed from, the portable device 100, then another may be inserted while the portable device is in the operating state. Next, at block 824, a check is made to determine if another battery is detected. If not, NO branch is taken to return to block 820 to continue in the active state and monitor for another battery. If another battery 101, 102 is detected at block 824, the process moves to block 812 to repeat the ensuing verifying steps.

In summary, a portable device having detachable main and auxiliary batteries and a discharging and charging circuit for discharging and charging the batteries verifies the brand and type of such batteries before using or re-charging them. By verifying the brand and type of the main and auxiliary batteries before using or re-charging them, it can be ensured that the portable device is operated reliably and safely from high quality batteries.

What is claimed is:

1. A battery for powering a portable device in an operating state, comprising:
    a plurality of cells coupled to one another to produce a predetermined output voltage;
    a memory device for storing data including at least, a registration number, an identification code indicating a battery type, and a predetermined multi-character message, the registration number including at least a predetermined brand code, a serial number code, and a predetermined type code, and the multi-character message including a multi-character year and a plurality of alphanumeric characters; and
    at least one data bus line coupled to the memory device for access to the data stored therein.

2. An battery according to claim 1 further comprising a thermistor device thermally coupled to at least one of the plurality of cells.

3. An battery according to claim 1 wherein the memory device includes a portion where the registration number has been laser engraved.

4. A method of identifying a type and brand of a battery coupled to power a portable device in an operating state, the battery including a memory storing data including at least a brand code, a type code and a multi-character message, the method comprising the steps of:
    (a) detecting the battery;
    (b) reading the brand code, type code and multi-character message from the memory of the battery which is detected;

(c) determining if the read brand code, type code and multi-character message substantially match a predetermined brand code, a predetermined type code and a predetermined multi-character message, respectively, and indicating when a match is detected;

(d) continuing to power the portable device from the battery when the match is detected; and (e) powering down the portable device when the match is not detected.

5. A method of identifying according to claim 4 wherein the portable device is coupled to a second battery which includes a memory storing data including at least a brand code, a type code and a multi-character message, and wherein the steps of said method are repeated for said second bakery.

6. A method of identifying according to claim 4 wherein the battery includes a thermistor device, and wherein said step (a) further includes the step of detecting the thermistor device in order to determine when a battery is detected.

7. Portable apparatus, comprising:

a battery producing an output voltage for powering the portable apparatus in an operating state, the battery including a plurality of cells coupled to one another to produce the output voltage, and the battery further including a memory device for storing data including at least a brand code, a type code and a multi-character message;

at least one data bus line coupled to the memory device of the battery for access to the data stored therein; and a controller coupled to the output voltage and coupled to the data bus line for detecting the battery, reading the brand code, type code and multi-character message from the memory device of the battery which is detected, determining if the read brand code, type code and multi-character message substantially match a predetermined brand code, a predetermined type code and a predetermined multi-character message, respectively, and indicating when a match is detected, continuing to power the portable apparatus from the battery when the match is detected; and powering down the portable apparatus when the match is not detected.

8. A method of identifying a type and brand of a battery coupled to power a portable device in an operating state, the battery including a thermistor device and a memory storing data including at least a brand code, a type code and a multi-character message, the method comprising the steps of:

(a) detecting the thermistor device in order to determine when the battery is detected;

(b) terminating charging of the battery when the battery is not detected.

(c) reading the brand code, type code and multi-character message from the memory of the battery when the battery is detected;

(d) determining if the read brand code, type code and multi-character message substantially match a predetermined brand code, a predetermined type code and a predetermined multi-character message, respectively, and indicating when a match is detected;

(e) continuing to power the portable device from the battery when the match is detected; and (f) powering down the portable device when the match is not detected.

9. A method of identifying a type and brand of a battery coupled to power a portable device in an operating state, the battery including a memory storing data including at least a brand code, a type code and a multi-character message, the multi-character message includes a multi-character year and a plurality of alphanumeric characters, the method comprising the steps of:

(a) detecting battery;

(b) reading the brand code, type code and multi-character message from the memory of the battery which is detected;

(c) comparing each character of the read brand code, type code and multi-character message except the multi-character year to each corresponding character of a predetermined brand code, a predetermined type code and a predetermined multi-character message, respectively, and indicating when a match is detected;

(d) continuing to power the portable device from the battery when the match is detected; and (e) powering down the portable device when the match is not detected.

10. A method of identifying a type and brand of a battery coupled to and being charged by a portable device coupled to an external power supply, the battery including a thermistor device and a memory storing data including at least a brand code, a type code and a multi-character message, the method comprising the steps (a) detecting the thermistor device in order to determine when the battery is detected;

(b) terminating charging of the battery when the battery is not detected.

(c) reading the brand code, type code and multi-character message from the memory of the battery when the battery is detected;

(d) determining if the read brand code, type code and multi-character message substantially match a predetermined brand code, a predetermined type code and a predetermined multi-character message, respectively, and indicating when a match is detected;

(e) continuing to charge the battery when the match is detected; and (f) terminating charging of the battery when the match is not detected.

11. A method of identifying a type and brand of a battery coupled to and being charged by a portable device coupled to an external power supply, the battery including a thermistor device and a memory storing data including at least a brand code, a type code and a multi-character message, the multi-character message includes a multi-character year and a plurality of alphanumeric characters, the method comprising the steps of:

(a) detecting battery;

(b) reading the brand code, type code and multi-character message from the memory of the battery which is detected;

(c) comparing each character of the read brand code, type code and multi-character message except the multi-character year to each corresponding character of a predetermined brand code, a predetermined type code and a predetermined multi-character message, respectively, and indicating when a match is detected;

(d) continuing to charge the battery when the match is detected; and (e) terminating charging of the battery when the match is not detected.

12. A method of identifying a type and brand of a battery coupled to power a portable device in an operating state, the battery including a memory storing data including at least a brand code, a type code and a multi-character message, the method comprising the steps of:

(a) detecting the battery;
(b) reading the brand code, type code and multi-character message from the memory of the battery which is detected;
(c) determining if the read brand code, type code and multi-character message substantially match a predetermined brand code, a predetermined type code and a predetermined multi-character message, respectively, and indicating when a match is detected;
(d) continuing to power the portable device from the battery when the match is detected;
(e) generating, when the match is not detected, an alerting indication for a predetermined time indicating to a user that an invalid battery has been detected; and
(f) powering down the portable device after the predetermined time.

13. A method of identifying according to claim 12 wherein said portable device includes a display and step (e) further includes the step of placing a bad battery notice in the display.

14. A method of identifying according to claim 12 wherein said step (e) further includes the step of sounding a tone.

15. A method of identifying a type and brand of a battery coupled to power a portable device in an operating state, the battery including a memory storing data including at least a brand code, a type code and a multi-character message, the method comprising the steps of:

(a) detecting the battery;
(b) reading the brand code, type code and multi-character message from the memory of the battery which is detected;
(c) determining if the read brand code, type code and multi-character message substantially match a predetermined brand code, a predetermined type code and a predetermined multi-character message, respectively, and indicating when a match is detected;
(d) continuing to power the portable device from the battery when the match is detected; and
(e) generating, when the match is not detected, an alerting indication for a predetermined time indicating to a user that an invalid battery has been detected.

16. A method of identifying according to claim 15 wherein said portable device includes a display and step (e) further includes the step of placing a bad battery notice in the display.

17. A method of identifying according to claim 15 wherein said step (e) further includes the step of sounding a tone.

18. A method of identifying a type and brand of a battery coupled to power a portable radiotelephone in an operating state, the battery including a memory storing data including at least a brand code, a type code and a multi-character message, and the portable radiotelephone making and receiving telephone calls, the method comprising the steps of:

(a) detecting the battery;
(b) reading the brand code, type code and multi-character message from the memory of the battery which is detected;
(c) determining if the read brand code, type code and multi-character message substantially match a predetermined brand code, a predetermined type code and a predetermined multi-character message, respectively, and indicating when a match is detected;
(d) continuing to power the portable radiotelephone from the battery when the match is detected;
(e) generating, when the match is not detected, an alerting indication for a predetermined time indicating to a user that an invalid battery has been detected; and
(f) terminating a telephone call in process and powering down the portable device after the predetermined time.

19. A method of identifying according to claim 18 wherein said portable device includes a display and step (e) further includes the step of placing a bad battery notice in the display.

20. A method of identifying according to claim 18 wherein said step (e) further includes the step of sounding a tone.

21. Portable apparatus, comprising:

a battery producing an output voltage for powering the portable apparatus in an operating state, the battery including a plurality of cells coupled to one another to produce the output voltage, and the battery further including a memory device for storing data including at least a brand code, a type code and a multi-character message;

at least one data bus line coupled to the memory device of the battery for access to the data stored therein; and a controller coupled to the output voltage and coupled to the data bus line for detecting the battery, reading the brand code, type code and multi-character message from the memory device of the battery which is detected, determining if the read brand code, type code and multi-character message substantially match a predetermined brand code, a predetermined type code and a predetermined multi-character message, respectively, and indicating when a match is detected, continuing to power the portable apparatus from the battery when the match is detected; generating, when the match is not detected, an alerting indication for a predetermined time indicating to a user that an invalid battery has been detected; and powering down the portable apparatus after the predetermined time.

22. The portable apparatus according to claim 21 further including a display, and wherein the controller places a bad battery notice in the display when the match is not detected.

23. The portable apparatus according to claim 21 wherein the controller sounds a tone when the match is not detected.

24. Portable apparatus, comprising:

a battery producing an output voltage for powering the portable apparatus in an operating state, the battery including a plurality of cells coupled to one another to produce the output voltage, and the battery further including a memory device for storing data including at least a brand code, a type code and a multi-character message;

at least one data bus line coupled to the memory device of the battery for access to the data stored therein; and a controller coupled to the output voltage and coupled to the data bus line for detecting the battery, reading the brand code, type code and multi-character message from the memory device of the battery which is detected, determining if the read brand code, type code and multi-character message substantially match a predetermined brand code, a predetermined type code and a predetermined multi-character message, respectively, and indicating when a match is detected, continuing to power the portable apparatus from the battery when the match is detected; and generating, when the match is not detected, an alerting indication for a predetermined time indicating to a user that an invalid battery has been detected.

25. The portable apparatus according to claim 24 further including a display, and wherein the controller places a bad battery notice in the display when the match is not detected.

26. The portable apparatus according to claim 24 wherein the controller sounds a tone when the match is not detected.

27. A portable radiotelephone for making and receiving telephone calls, the portable radiotelephone comprising:

a battery producing an output voltage for powering the portable radiotelephone in an operating state, the battery including a plurality of cells coupled to one another to produce the output voltage, and the battery further including a memory device for storing data including at least a brand code, a type code and a multi-character message;

at least one data bus line coupled to the memory device of the battery for access to the data stored therein; and a controller coupled to the output voltage and coupled to the data bus line for detecting the battery, reading the brand code, type code and multi-character message from the memory device of the battery which is detected, determining if the read brand code, type code and multi-character message substantially match a predetermined brand code, a predetermined type code and a predetermined multi-character message, respectively, and indicating when a match is detected, continuing to power the portable radiotelephone from the battery when the match is detected; generating, when the match is not detected, an alerting indication for a predetermined time indicating to a user that an invalid battery has been detected; and terminating a telephone call in process and powering down the portable radiotelephone after the predetermined time.

28. The portable radiotelephone according to claim 27 further including a display, and wherein the controller places a bad bakery notice in the display when the match is not detected.

29. The portable radiotelephone according to claim 27 wherein the controller sounds a tone when the match is not detected.

* * * * *